US012452707B2

(12) United States Patent
Mendo Mateo et al.

(10) Patent No.: US 12,452,707 B2
(45) Date of Patent: Oct. 21, 2025

(54) USER LEVEL MONITORING OF HSDPA RADIO CHANNEL QUALITY

(71) Applicant: Telefonaktiebolaget LM Ericsson (publ), Stockholm (SE)

(72) Inventors: Adriano Mendo Mateo, Málaga (ES); José María Ruiz Avilés, Málaga (ES); Juan Jesus Sanchez Sanchez, Málaga (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 881 days.

(21) Appl. No.: 17/598,383

(22) PCT Filed: Aug. 6, 2019

(86) PCT No.: PCT/EP2019/071111
§ 371 (c)(1),
(2) Date: Sep. 27, 2021

(87) PCT Pub. No.: WO2020/200490
PCT Pub. Date: Oct. 8, 2020

(65) Prior Publication Data
US 2022/0159495 A1  May 19, 2022

(30) Foreign Application Priority Data
Apr. 1, 2019 (EP) .................................... 19382238

(51) Int. Cl.
*H04W 16/08* (2009.01)
*H04B 7/00* (2006.01)
(Continued)

(52) U.S. Cl.
CPC .................................... *H04W 24/08* (2013.01)

(58) Field of Classification Search
None
See application file for complete search history.

(56) References Cited

U.S. PATENT DOCUMENTS 9,386,594 B2 * 7/2016 Liu ..................... H04W 72/569
9,420,476 B2 * 8/2016 Koutsimanis .......... H04J 11/005
(Continued)

FOREIGN PATENT DOCUMENTS

CN 101500258 B 12/2010
EP 3119134 A1 1/2017
WO WO-2008153359 A2 * 12/2008 .......... H04W 52/286

OTHER PUBLICATIONS

International Search Report and Written Opinion of the International Searching Authority for PCT International Application No. PCT/EP2019/071111 dated Nov. 27, 2019.
(Continued)

*Primary Examiner* — Sithu Ko
(74) *Attorney, Agent, or Firm* — Sage Patent Group

(57) ABSTRACT

A method of monitoring a UMTS network is provided. The method comprises getting a recorded Radio Resource Control, RRC, message associated with a user and getting recorded data indicative of cell radio resource usage in the UMTS network. Further, the method comprises correlating the RRC message with the data indicative of cell radio resource usage. Further, the method comprises determining a measurement quantity indicated in the RRC message and, based on the measurement quantity indicated in the RRC message and the correlated data indicative of cell radio resource usage, calculating quality of a HSDPA radio channel for the user.

10 Claims, 6 Drawing Sheets

(51) Int. Cl.
*H04L 5/00* (2006.01)
*H04W 24/08* (2009.01)
*H04W 72/04* (2023.01)

(56) References Cited

U.S. PATENT DOCUMENTS

| | | | | |
|---|---|---|---|---|
| 9,485,662 | B2* | 11/2016 | Zhuang | H04L 5/0037 |
| 9,491,709 | B2* | 11/2016 | Choi | H04W 52/365 |
| 9,510,240 | B2* | 11/2016 | Lorca Hernando | H04W 28/0808 |
| 2004/0001472 | A1* | 1/2004 | Kwak | H04W 52/30 370/441 |
| 2008/0002617 | A1* | 1/2008 | Peisa | H04W 72/542 370/329 |
| 2008/0225744 | A1* | 9/2008 | DiGirolamo | H04W 76/28 370/252 |
| 2019/0150005 | A1* | 5/2019 | Cendrillon | H04L 41/0823 370/252 |

OTHER PUBLICATIONS

Voigt et al., "Optimizing HSDPA Performance in the UMTS Network Planning Process," IEEE 61st Vehicular Technology Conference, 2005, pp. 2384-2388.
3GPP TS 25.214 V15.0.0, "3rd Generation Partnership Project; Technical Specification Group Radio Access Network; Physical layer procedures (FDD) (Release 15)," Technical Specification, Sep. 2017, 141 pages.
ETSI TS 125 331 V9.9.0, "Universal Mobile Telecommunications System (UMTS); Radio Resource Control (RRC); Protocol specification (3GPP TS 25.331 version 9.9.0 Release 9)," Technical Specification, Jan. 2012, 1821 pages.
Kurnaz et al., "A novel empirical SIR-to-CQI mapping rule for DC-HSDPA systems," Turkish Journal of Electrical Engineering & Computer Sciences, Sep. 15, 2017, 9 pages.
Motorola et al., "Revised CQI Proposal," R1-02-0675, TSG-RAN-WG1 HSDPA, Paris, France, Apr. 9-12, 2002, 8 pages.
Motorola, "HSDPA CQI Proposal," R1-02-0459, TSG-RAN-WG1 HSDPA, Paris, France, Apr. 9-12, 2002, 6 pages.
Motorola et al., "Revised HSDPA CQI Proposal," R1-02-0458, TSG-RAN-WG1 HSDPA, Paris, France, Apr. 9-12, 2002, 6 pages.
Ericsson, "Basic Features WCDMA RAN," User Guide, 2018, 133 pages.
ETSI TS 136 213 V14.7.0, "LTE; Evolved Universal Terrestrial Radio Access (E-UTRA); Physical layer procedures (3GPP TS 36.213 version 14.7.0 Release 14)," Technical Specification, Oct. 2018, 469 pages.

* cited by examiner

USER LEVEL MONITORING OF HSDPA RADIO CHANNEL QUALITY

CROSS REFERENCE TO RELATED APPLICATIONS

This application is a 35 U.S.C. § 371 national stage application of PCT International Application No. PCT/EP2019/071111 filed on Aug. 6, 2019, which claims the benefit of European Patent Application No. 19382238.4, filed on Apr. 1, 2019, the disclosures and content of which are incorporated by reference herein in their entireties.

TECHNICAL FIELD

The present invention relates to methods for monitoring a UMTS (Universal Mobile Telecommunications System) network and to corresponding radio devices, systems, and computer programs.

BACKGROUND

In wireless communication networks, it is known to perform various kinds of monitoring during operation of the wireless communication network, e.g., with the aim of measuring performance or user experience. In this way, the operator may obtain information which can be used as input for optimizing operation or design of the wireless communication network. However, providing the wireless communication network with dedicated mechanisms for measuring, reporting, and analyzing user experiences may be costly and time consuming. This is specifically problematic in the case of short-term optimization projects. Accordingly, there is a need for solutions which can be implemented with low complexity and little modification of existing network infrastructure.

In many relevant scenarios a radio channel between a UE (user equipment) and the network constitutes a main bottleneck. Quality of the radio channel may thus be used as a basis for estimating user experience. For data traffic, data throughput may be used as an indicator for the user experience. The user throughput can be derived by from the quality of the radio channel in combination with availability of radio resources. In this way, it can be taken into account that even when there is a high quality of the radio channel, the user experience may suffer due to a lack of available radio resources, e.g., because there are too many users competing for the same radio resources.

The quality of the radio channel is typically measured by the UE and then reported as a CQI (Channel Quality Indicator) to the network. However, in some scenarios monitoring the CQI on a user level is not supported. This may for example be the case in some deployments of UMTS networks with HSDPA (High Speed Data Packet Access) enhancements. Here, reporting of the CQI is implemented as part of MAC (Medium Access Control) protocol functionalities within the UTRAN (UMTS Terrestrial Radio Access Network), without any support for monitoring or otherwise observing the CQI from outside the UTRAN. This may be attributed to the reporting of information for monitoring purposes being implemented at a node referred to as RNC (Radio Network Controller), whereas MAC functionalities are implemented at the base station, in the UMTS technology referred to as "Node B".

Accordingly, there is a need for techniques which allow for efficiently monitoring an UMTS network, in particular with respect to user experience.

SUMMARY

According to an embodiment, a method of monitoring a UMTS network is provided. The method comprises getting a recorded Radio Resource Control (RRC) message associated with a user and getting recorded data indicative of cell radio resource usage in the UMTS network. Further, the method comprises correlating the RRC message with the data indicative of cell radio resource usage. Further, the method comprises determining a measurement quantity indicated in the RRC message and, based on the measurement quantity indicated in the RRC message and the correlated data indicative of cell radio resource usage, calculating quality of a HSDPA radio channel for the user.

According to a further embodiment, a device for monitoring a UMTS network is provided. The device is configured to get a recorded RRC message associated with a user and getting recorded data indicative of cell radio resource usage in the UMTS network. Further, the device is configured to correlate the RRC message with the data indicative of cell radio resource usage. Further, the device is configured to determine a measurement quantity indicated in the RRC message and, based on the measurement quantity indicated in the RRC message and the correlated data indicative of cell radio resource usage, calculate quality of a HSDPA radio channel for the user.

According to a further embodiment, a device for monitoring a UMTS network is provided. The device comprises at least one processor and a memory. The memory contains instructions executable by said at least one processor, whereby the device is operative to get a recorded RRC message associated with a user and getting recorded data indicative of cell radio resource usage in the UMTS network. Further, the memory contains instructions executable by said at least one processor, whereby the device is operative to correlate the RRC message with the data indicative of cell radio resource usage. Further, the memory contains instructions executable by said at least one processor, whereby the device is operative to determine a measurement quantity indicated in the RRC message and, based on the measurement quantity indicated in the RRC message and the correlated data indicative of cell radio resource usage, calculate quality of a HSDPA radio channel for the user.

According to a further embodiment of the invention, a computer program or computer program product is provided, e.g., in the form of a non-transitory storage medium, which comprises program code to be executed by at least one processor of a device for monitoring a UMTS network. Execution of the program code causes the device to get a recorded RRC message associated with a user and getting recorded data indicative of cell radio resource usage in the UMTS network. Further, execution of the program code causes the device to correlate the RRC message with the data indicative of cell radio resource usage. Further, execution of the program code causes the device to determine a measurement quantity indicated in the RRC message and, based on the measurement quantity indicated in the RRC message and the correlated data indicative of cell radio resource usage, calculate quality of a HSDPA radio channel for the user.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to monitoring a UMTS network, in particular with respect to user experience.

In the illustrated examples, quality of a HSDPA radio channel may be efficiently monitored in situations where the quality of the HSDPA radio channel for a user is not directly observable from outside the UTRAN, by deriving the quality the HSDPA radio channel indirectly from other observable data, in particular a measurement quantity in an RRC message associated with the user, and data indicative of cell radio resource usage, in the following also referred to as cell resource usage data. In this way, information which is readily observable from outside the UTRAN may be used for assessing the quality of the radio channel, in particular by calculating a CQI for the radio channel.

Figure 1:
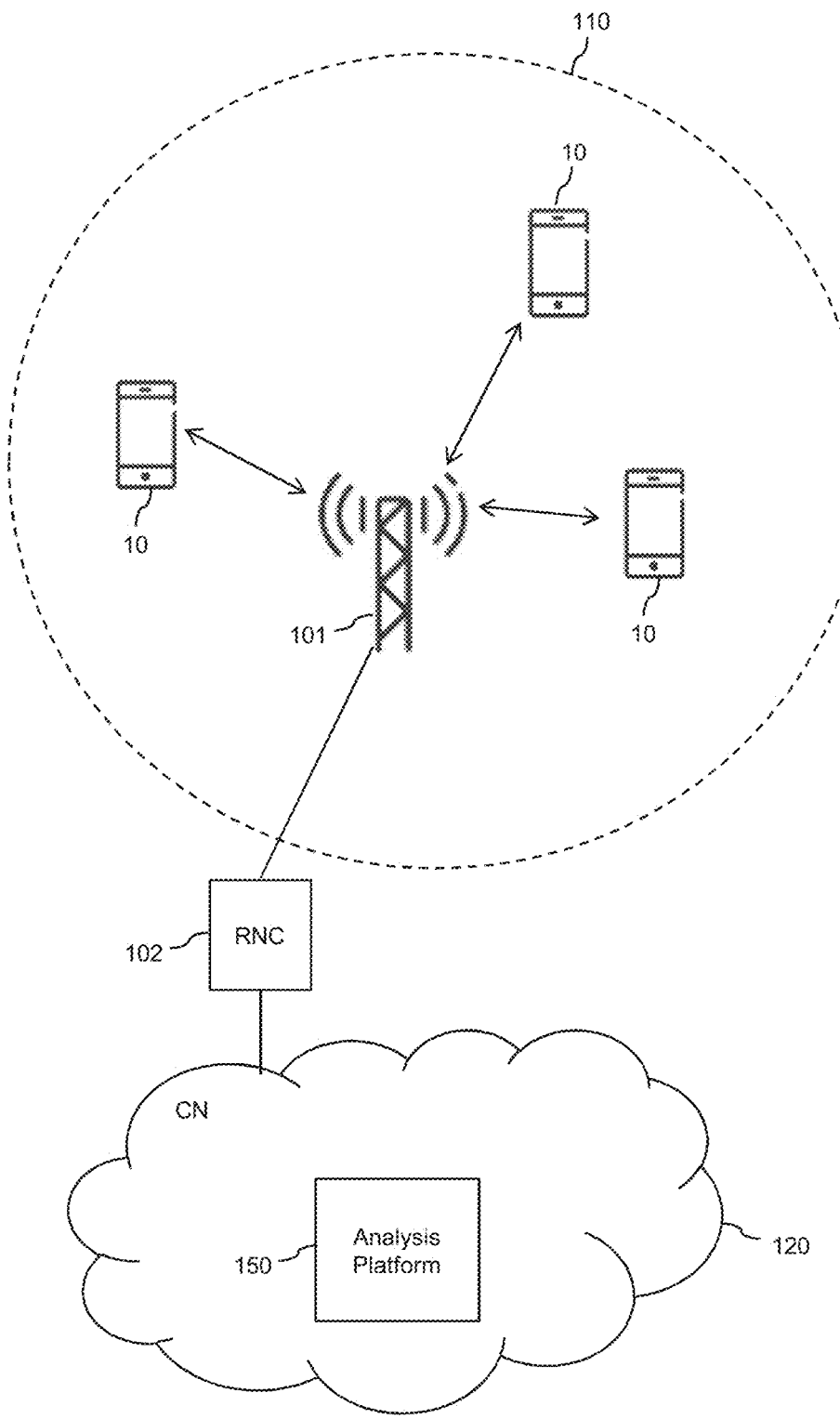
FIG. 1 shows exemplary elements of a UMTS network which implements a monitoring process according to an embodiment of the invention.

FIG. 1 illustrates an exemplary system for implementing the illustrated concepts. In particular, FIG. 1 shows multiple UEs 10 in a cell 110 of the UMTS network. Each UE 10 is associated with a certain user of the UMTS network. The cell 110 is assumed to be served by a base station 101, which may also be referred to as a Node B, and by an RNC 102. Each UE 10 may utilize an HSDPA connection for communicating with the UTRAN. The Node B 101 and the RNC 102 are parts of the UTRAN serving the UEs 10 in the cell 110. Each UE 10 may utilize an HSDPA connection, in particular a HS-DSCH (High Speed Data Shared Channel) for communicating with the UTRAN.

Further, FIG. 1 illustrates, a core network (CN) 120 of the UMTS network. The RNC is connected to the CN 120. As further illustrated, the CN 120 includes an analysis platform 150 which may implement the monitoring functionalities described herein. For this purpose, the analysis platform 150 may receive information from the RNC 102. It is noted that in a similar manner the analysis platform 150 may also receive information from other RNCs (not illustrated) of the UMTS network. Accordingly, the monitoring functionalities described herein may be implemented with respect to various UTRAN subsystems of the UMTS network, various cells of the UMTS network, and with respect to various UEs served in these cells.

Figure 2:
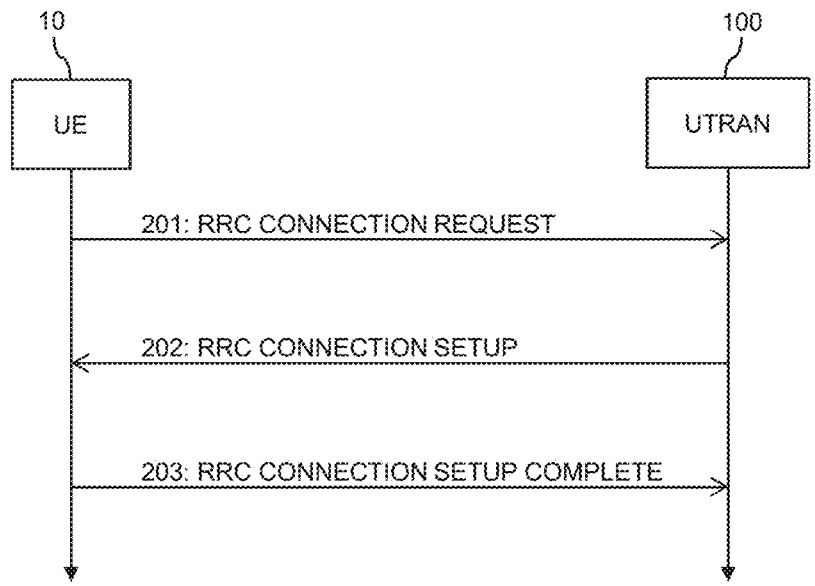
FIG. 2 illustrates an example of processes involving transmission of an RRC message as utilized as input data in a monitoring process according to an embodiment of the invention.

As explained in more detail below, the illustrated concepts enable the analysis platform 150 or some other monitoring device outside the UTRAN, to estimate a CQI value, for the HSDPA connection of a certain user even though the RNC 102 does not record or report the CQI of the HSDPA connection to the analysis platform 150. The estimation relies on other recorded information which is readily observable, in RRC messages recorded on a user level. Among these RRC messages, a specific type of RRC message referred to as "RRC Connection Request" reports a measurement quantity referred to as Ec/No of the CPICH (Common Pilot Channel). The Ec/No value reported in the RRC Connection Request message is measured during a random access procedure performed by the UE 10 when connecting to the cell 110. An RRC connection establishment procedure in accordance with 3GPP TS 25.331 V15.4.0 (2018-09), which involves transmission of a RRC Connection Request message 201, is illustrated in FIG. 2. The RRC connection establishment procedure may be triggered by a successful random access procedure. As illustrated in FIG. 2, the RRC connection establishment procedure involves that the UE 10 sends the RRC Connection Request message 201 to the UTRAN 100. The UTRAN 100 responds to the RRC Connection Request message 201 by sending an RRC Connection Setup message 202 to the UE 10. The UE 10 then confirms successful setup of the RRC Connection by sending an RRC Connection Setup Complete message 203 to the UTRAN 100. Further details concerning the RRC messages 201, 202, 203 can be found in 3GPP TS 25.331 V15.4.0.

Figure 3:
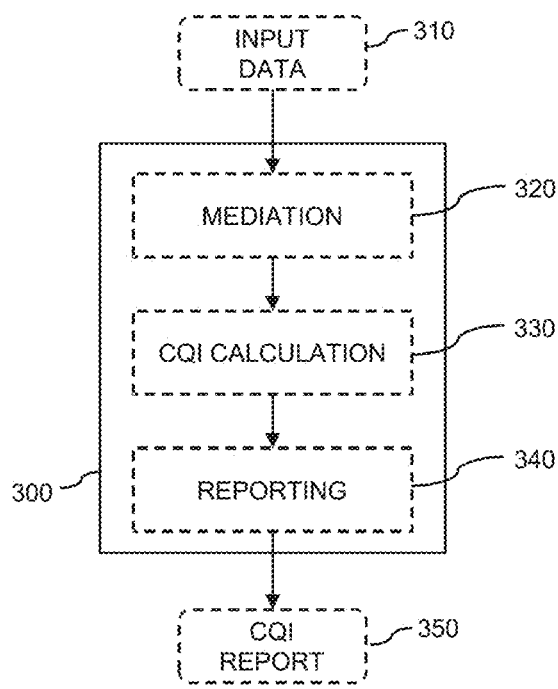
FIG. 3 schematically illustrates functionalities of a monitoring device according to an embodiment of the invention.

FIG. 3 provides an overview of functionalities of a monitoring device 300 which may be used to implement the illustrated concepts. As illustrated in FIG. 3, the monitoring device 300 receives input data 310. The input data 310 include, inter alia, RRC messages recorded on a user level. Each recorded RRC message is stored in relation to the user to which the RRC message pertains. Further, the input data 310 include the recorded cell resource usage data. The input data 310 may be provided by various nodes of the UMTS network, including UTRAN nodes and/or CN nodes.

As illustrated, the monitoring device 300 includes a mediation function 320, a CQI calculation function 330, and a reporting function 340. The mediation function 320 may process the input data 310 to collect and select the data required for calculation of the QCI. The CQI calculation function 330 accomplishes the calculation of the CQI value from the input data collected and selected by the mediation function 320. Details of the CQI calculation process are explained below. The reporting function 340 is responsible for exposing the calculated CQI value to other nodes or systems inside or outside the UMTS network. This may involve generating a CQI report 350 indicating the calculated CQI value. Based on the CQI value indicated in the CQI report 350, such other node or system may perform a further analysis, e.g., by estimating user experience. The reporting function 340 may also record the calculated CQI value on the user level and report the recorded CQI values.

In 3GPP TS 25.215 V15.0.0 (2018-06), the Ec/No is defined as the value of received energy per chip divided by the power density in the band. As shown below, by correlating the Ec/No with the cell resource usage data at the time of the RRC connection request, the Ec/No value can be transformed to a SNR (signal-to-noise-ratio) for the HS-DSCH. The SNR can then in turn be converted to a CQI value. The CQI value obtained in this way can then be used for further evaluating the user experience. For example, the CQI value and availability of radio resources indicated by the cell resource usage data can be combined to calculate an achievable data throughput for the user.

For the UMTS technology, a definition of the CQI can be found in 3GPP TS 25.214 V15.0.0 (2017-09). There is a linear relationship between the CQI value and the SNR for the HS-DSCH. This linear relationship can be expressed as:

$$CQI = \min(\max(\text{round}(\sum_{i=1}^{num\_hs\_codes}[SNR_{HS,i}][dB] + 4.5), 1), 30), \quad (1)$$

where $SNR_{HS,i}$ denotes the SNR of the HS-DSCH for the code with index i.

Assuming that the power is distributed evenly among all the HS-DSCH codes and the noise is the same, this can be simplified to:

$$CQI = \min(\max(\text{round}([num\_avail\_hs\_codes \cdot SNR_{HS}][dB] + 4.5), 1), 30) \quad (2)$$

where num_avail_hs_codes is the number of codes available for HS-DSCH and SNRHS denotes the SNR for the HS-DSCH.

Accordingly, the CQI can be calculated from the SNR for HS-DSCH and the number of available codes for the HS-DSCH. By definition, the SNR for HS-DSCH is:

$$SNR_{HS} = \frac{P_{HS,RX}}{N_{HS,RX}}, \quad (3)$$

where $P_{HS,RX}$ is the received power of the HS-DSCH and $N_{HS,RX}$ is the received noise and interference which affects the HS-DSCH.

Further, it can be assumed that all the interference in $N_{HS,RX}$ is coming from other cells than the serving cell, because due to use of orthogonal codes the remaining received power coming from the serving cell is negligible interference then. Accordingly, the received noise and interference can be estimated as:

$$N_{HS,RX} = \frac{P_{INTER,RX}}{SF_{HS}}, \quad (4)$$

where $P_{INTER,RX}$ is the total received power coming from other cells than the serving cell, and $SF_{HS}$ is the spreading factor of HS-DSCH, which is fixed to 16, and represents the amount of the total interference power which is affecting to a single HS-DSCH code.

Using that, the SNR for HS-DSCH can be expressed as:

$$SNR_{HS} = P_{HS,RX} \bigg/ \left(\frac{P_{INTER,RX}}{SF_{HS}}\right). \quad (5)$$

In relation (5), multiplying numerator and denominator by $P_{CPICH,RX}$, the received power of the CPICH, yields:

$$SNR_{HS} = \frac{SF_{HS} * P_{HS,RX} \cdot P_{CPICH,RX}}{P_{INTER,RX} \cdot P_{CPICH,RX}} = SF_{HS} \cdot \frac{P_{CPICH,RX}}{P_{INTER,RX}} \cdot \frac{P_{HS,RX}}{P_{CPICH,RX}} \quad (6)$$

The relation between the HS-DSCH and CPICH powers is the same at reception and transmission points, because the HS-DSCH and the CPICH originate from the same source, e.g., the Node B 101. Accordingly, relation (6) can be simplified to:

$$SNR_{HS} = SF_{HS} \cdot \frac{P_{CPICH,RX}}{P_{INTER,RX}} \cdot \frac{P_{HS,TX}}{P_{CPICH,RX}}, \quad (7)$$

where $P_{HS,TX}$ is the transmitted HS-DSCH power and $P_{CPICH,TX}$ is the transmitted CPICH power. The transmitted power of the CPICH $P_{CPICH,TX}$ can be obtained directly from the recorded cell resource usage data.

$P_{HS,TX}$ can be estimated with the remaining power which is not used by the Release '99 (R99) traffic, i.e., other traffic than HSDPA traffic:

$$P_{HS,TX} = \max\_dl\_power - \quad (8)$$
$$dl\_non\_hs\_tx\_power \cdot \max\_dl\_power / num\_avail\_hs\_codes,$$

where max dl_power is the maximum cell transmitted power and dl_non_hs_tx_power is the ratio of power used by the R99 traffic to the maximum cell transmitted power.

The parameters max_dl_power and dl_non_hs_tx_power can be obtained directly from the cell resource usage data, whereas num_avail_hs_codes can be calculated from the cell resource usage data as the remaining codes in the cell not used for R99 traffic:

$$num\_avail\_hs\_codes = \text{floor}(16 - total\_dl\_chan\_ \quad (9)$$
$$code\_tree\_consumption \cdot (16 - num\_hs\_pdsch\_codes)),$$

where total_dl_chan_code_tree_consumption is the ratio of codes used by R99 traffic to the total number of codes available for R99 traffic, and num_hs_pdsch_codes are the number of codes reserved for HSDPA traffic. The latter two parameters can be obtained directly from the recorded cell resource usage data.

For estimating the ratio $P_{CPICH,RX}/P_{INTER,RX}$ in relation (7), the Ec/No value reported in the RRC Connection Request message may be utilized. The content of the RRC Connection Request message is encoded in a format referred to as ASN.1 (Abstract Syntax Notation 1). Once the message is decoded, the reported Ec/No value, denoted by EcNo_asn1_value, may be transformed to an Ec/No value in decibels (dB):

$$Ec/No[dB] = (EcN0\_asn1\_value - 49)/2 \quad (10)$$

According to its definition, the Ec/No value may be expressed as:

$$Ec/No = E_{C,CPICH,RX}/No_{RX}, \quad (11)$$

where $E_{C,CPICH,RX}$ is the received energy per chip of the CPICH, and $No_{RX}$ is the total received power spectral density (expressed in Watts per Hertz).

In relation (11), multiplying numerator and denominator by the UMTS channel bandwidth BW (=5 MHz) and the UMTS chip rate CR (=3.84 Mcps), then yields:

$$Ec/No = (E_{C,CPICH,RX} \cdot BW \cdot CR)/(No_{RX} \cdot BW \cdot CR) \qquad (12)$$

The chip rate CR can be expressed as the inverse of the chip time $T_C$:

$$CR = 1/T_C. \qquad (13)$$

Further, the received CPICH power can be expressed as:

$$P_{CPICH,RX} = E_{C,CPICH,RX}/T_C. \qquad (14)$$

The total received power can be calculated as follows:

$$P_{TOTAL,RX} = No_{RX} \cdot BW. \qquad (15)$$

By using the expressions (13), (14), and (15), relation (12) can be transformed to:

$$Ec/No = P_{CPICH,RX} \cdot BW/P_{TOTAL,RX} \cdot CR \qquad (16)$$

Further, the total received power can be split as follows:

$$P_{TOTAL,RX} = P_{INTRA,RX} + P_{INTER,RX} \qquad (17)$$

where $P_{INTRA,RX}$ is the total received power coming from the serving cell.

Using expression (17) in relation (16) yields:

$$Ec/No = BW \Big/ \left(\frac{P_{INTRA,RX}}{P_{CPICH,RX}} + \frac{P_{INTER,RX}}{P_{CPICH,RX}}\right) \cdot CR. \qquad (18)$$

The relation between the total cell and CPICH powers is the same at reception and transmission points, because they come from the same cell, so that relation (18) can be transformed to:

$$Ec/No = BW \Big/ \left(\frac{P_{INTRA,TX}}{P_{CPICH,TX}} + \frac{P_{INTER,RX}}{P_{CPICH,RX}}\right) \cdot CR, \qquad (19)$$

where $P_{INTRA,TX}$ is the total transmitted power of the serving cell.

Accordingly, the missing term in relation (7) can be resolved as follows:

$$\frac{P_{CPICH,RX}}{P_{INTER,RX}} = 1 \Big/ \left(\frac{BW/CR}{Ec/No} - \frac{P_{INTRA,TX}}{P_{CPICH,TX}}\right) \qquad (20)$$

With this, relation (7) can be represented as:

$$SNR_{HS} = SF_{HS} \cdot \frac{P_{HS,TX}}{P_{CPICH,TX}} \Big/ \left(\frac{BW/CR}{E_C/No} - \frac{P_{INTRA,TX}}{P_{CPICH,TX}}\right). \qquad (21)$$

The total transmitted power of the serving cell can be calculated as follows:

$$P_{INTRA,TX} = \qquad (22)$$
$$(dl\_non\_hs\_tx\_power + dl\_hs\_req\_power) \cdot max\_dl\_power,$$

where dl_hs_req_power is the ratio of power requested for HSDPA traffic to the maximum cell transmitted power and can be obtained from the cell resource usage data.

Combining relations (2), (21), and (22), the CQI for the HS-DSCH can thus be calculated according to:

$$CQI = \min\left(\max\left(\text{round}\left(10 \cdot \log_{10}\left(\frac{SF_{HS} \cdot \dfrac{dl\_non\_hs\_tx\_power \cdot max\_dl\_power}{P_{CPICH,TX}}}{\dfrac{BW/CR}{10^{\left(\frac{EcNo\_asn1\_value - 49}{2 \cdot 10}\right)}} - \dfrac{(dl\_non\_hs\_tx\_power + dl\_hs\_req\_power) \cdot max\_dl\_power}{P_{CPICH,TX}}}\right)\right) + 4.5, 1\right), 30\right) \qquad (23)$$

Figure 4:
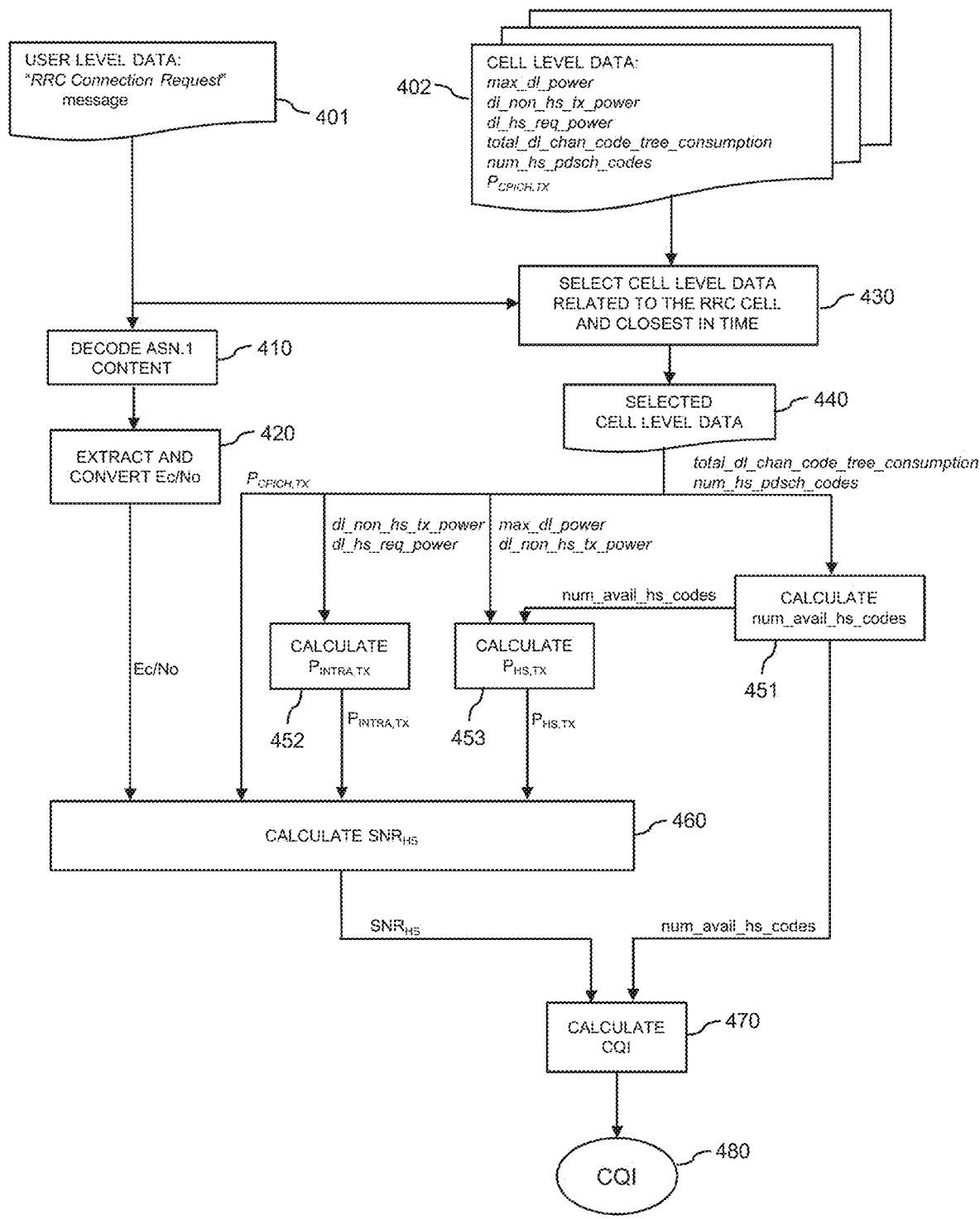
FIG. 4 illustrates an exemplary processes according to an embodiment of the invention.

Based on the above, calculation of the CQI can be implemented by a process as illustrated by the flowchart of FIG. 4.

As illustrated in FIG. 4, the process uses the following inputs: The RRC connection request message 401, obtained from recorded user level data, and recorded cell level data 402 including the above-mentioned cell resource usage data, namely the maximum cell transmitted power max_dl_power, the ratio of power dedicated for R99 traffic to the maximum cell transmitted power dl_non_hs_tx_power, the ratio of power requested for HSDPA traffic to the maximum cell transmitted power dl_hs_req_power, the ratio of codes used by R99 traffic to the total number of codes available for R99 traffic (code tree ratio) total_dl_chan_code_tree_consumption, the number of codes reserved for HSDPA traffic num_hs_pdsch_codes, and the CPICH transmitted power $P_{CPICH,TX}$.

At block 410, the ASN.1 content of the RRC Connection Request message 401 is decoded. At block 420 the Ec/No value reported in the RRC Connection Request message 401 is extracted and converted to units of dB, using relation (10).

At block 430, the RRC Connection Request message 401 and the recorded cell level data 402 are correlated. This specifically involves selecting the cell level data 402 which relates to the cell to which the RRC Connection Request message 401 was transmitted and which is closest in time to the transmission of the RRC Connection Request message 401. Accordingly, the correlation may involve a correlation in a spatial domain, by selecting the cell level data 402 related to the appropriate cell, and in a time domain, by selecting the cell level data 402 relevant to the time when the RRC Connection Request message 401 was transmitted. As illustrated in FIG. 4, the correlation of block 430 yields selected cell level data 440.

At block 451, the ratio of codes used by R99 traffic to the total number of codes available for R99 traffic, i.e., the parameter total_dl_chan_code_tree_consumption, and the number of codes reserved for HSDPA traffic, i.e., the parameter num_hs_pdsch_codes, are used to calculate the number of codes available for HSDPA traffic, i.e., the parameter num_avail_hs_codes. This may be accomplished using relation (9).

At block 452, the ratio of power dedicated for R99 traffic to the maximum cell transmitted power, i.e., the parameter dl_non_hs_tx_power, and the ratio of power requested for HSDPA traffic to the maximum cell transmitted power, i.e., the parameter dl_hs_req_power, are used to calculate the parameter $P_{INTRA,TX}$. This may be accomplished using relation (22).

At block 453, the maximum cell transmitted power, i.e., the parameter max_dl_power, the ratio of power dedicated for R99 traffic to the maximum cell transmitted power, i.e., the parameter dl_non_hs_tx_power, and the number of codes available for HSDPA traffic, i.e., the parameter num_avail_hs_codes delivered by block 451, are used to calculate the parameter $P_{HS,TX}$. This may be accomplished using relation (8).

At block 460, the outputs of blocks 420, 451, 452, 453 and the CPICH transmitted power $P_{CPICH,TX}$, from the selected cell level data 402 are used to calculate the SNR of the HS-DSCH, i.e., the parameter $SNR_{HS}$. This may be accomplished using relation (21).

At block 470, the outputs of blocks 451 and 460, i.e., the number of codes available for HSDPA traffic num_avail_hs_codes and the SNR of the HS-DSCH $SNR_{HS}$, are used to calculate the CQI for the HS-DSCH. This may be accomplished using relation (2). As an output 480, the process thus provides the CQI for the HS-DSCH. Accordingly, in a scenario where the CQI for the HS-DSCH itself is not recorded or otherwise reported for analysis purposes, the process of FIG. 4 can be used to estimate the CQI can be from other data recorded on the user level and the cell level.

Figure 5:
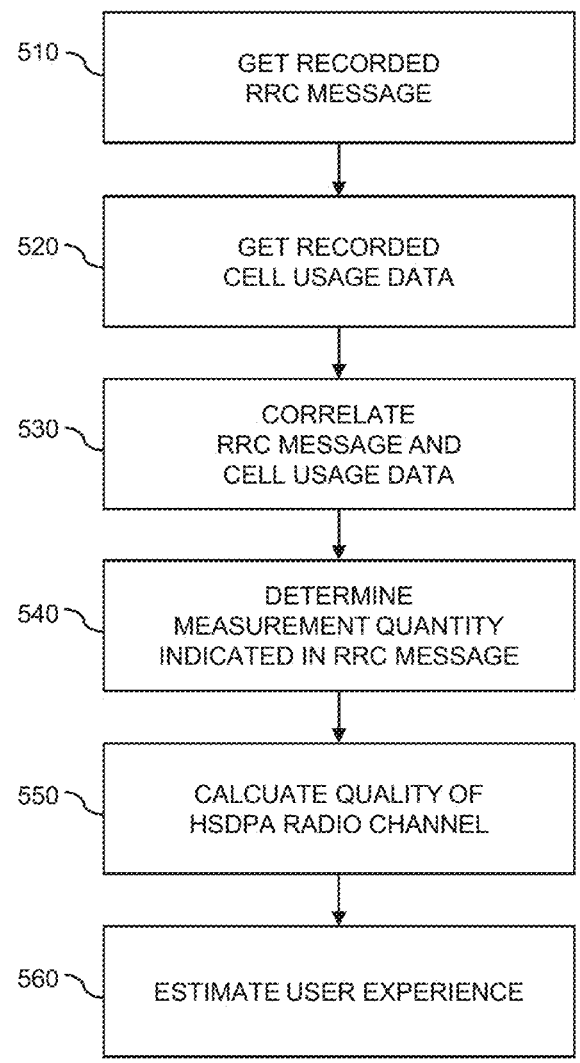
FIG. 5 shows a flowchart for illustrating a method according to an embodiment of the invention.

FIG. 5 shows a flowchart for illustrating a method of monitoring a UMTS network. The method of FIG. 5 may be used for implementing the illustrated concepts in a device for monitoring a UMTS network, e.g., corresponding to any of the above-mentioned entities 150 or 300.

If a processor-based implementation of the device is used, at least some of the steps of the method of FIG. 5 may be performed and/or controlled by one or more processors of the device. Such device may also include a memory storing program code for implementing at least some of the below described functionalities or steps of the method of FIG. 5.

At step 510, the device gets a recorded RRC message associated with a user. As explained above for the RRC messages 201, 401, the RRC message may correspond to an RRC Connection Request message. The recorded RRC message may be received from the UTRAN or some other node of the UMTS network, e.g., from a CN node.

At step 520, the device gets recorded data indicative of cell radio resource usage in the UMTS network, such as the above-mentioned cell level data 402. The recorded data indicative of cell radio resource usage may be received from the UTRAN or some other node of the UMTS network, e.g., from a CN node.

The data indicative of cell radio resource usage may include a maximum cell transmitted power, such as the above-mentioned parameter max_dl_power. Further, the data indicative of cell radio resource usage may include a ratio of power for HSDPA traffic to the maximum cell transmitted power, such as the above-mentioned parameter dl_hs_req_power. Further, the data indicative of cell radio resource usage may include a ratio of power for other traffic than the HSDPA traffic to the maximum cell transmitted power, such as the above-mentioned parameter dl_non_hs_tx_power. Further, the data indicative of cell radio resource usage may include a ratio of a number of codes used by other traffic than HSDPA traffic to a total number of codes available to other traffic than the HSDPA traffic, such as the above-mentioned parameter total_dl_chan_code_tree_consumption. Further, the data indicative of cell radio resource usage may include a number of codes reserved for HSDPA traffic, such as the above-mentioned parameter num_hs_pdsch_codes. Further, the data indicative of cell radio resource usage may include a transmitted power of a CPICH, such as the above-mentioned parameter $P_{CPICH,TX}$.

At step 530, the device correlates the RRC message with the data indicative of cell radio resource usage. This may for example involve selecting a subset of the data indicative of cell radio resource usage which relates to the cell in which the RRC message was transmitted and/or which was recorded at a time matching the time when the RRC message was transmitted.

At step 540, the device determines a measurement quantity indicated in the RRC message. The measurement quantity may include or correspond to a value of received energy per chip divided by the power density in the band, such as the above-mentioned Ec/No value of the CPICH.

At step 550, the device calculates quality of a HSDPA radio channel for the user. This calculation is based on the measurement quantity indicated in the RRC message and the correlated data indicative of cell radio resource usage. The calculation of step 550 may in particular involve calculating a CQI for the HSDPA radio channel. Details of implementing the calculation are explained in connection with equations (1) to (23) and in connection with the calculation process of FIG. 4.

At step 560, the device may estimate user experience for the user based on the calculated quality of the radio channel. Alternatively, the device may also report the calculated quality of the HSDPA radio channel to some other device, node, or system, and the estimation of the user experience could then be accomplished by this other device, node, or system. In addition or as an alternative, the device may record the calculated quality of the HSDPA radio channel on a user level and make such recorded information available for analysis in the device or by some other device, node, or system, e.g., for estimation of user experience. The estimation of the user experience may for example involve estimation of a data throughput for the user and/or estimation of an end-user video performance.

In some scenarios, the estimation of the user experience may involve estimating the achievable data throughput of the user based on the calculated quality of the HSDPA radio channel, in particular the CQI, content of the RRC Connection Setup Complete message 203, and the cell resource usage data, in particular the number of available codes for the HS-DSCH, e.g., the above-mentioned parameter num_hs_pdsch_codes, and the number of HSDPA users in the cell. From the content of the RRC Connection Setup Complete message, an indication of the HSDPA UE Category can be extracted. The HSDPA UE Category can be used to select a corresponding CQI mapping table, e.g., as specified in 3GPP TS 25.214 V15.0.0, and determine a code bit rate associated with the CQI from the CQI mapping table. The number of available HS-DSCH codes may then be split among all the HSDPA users, and based on the resulting HS-DSCH codes available for the considered user and the code bit rate, the achievable data throughput for the user can be estimated. The data throughput itself can serve as an indicator of user experience. Further, the data throughput can be used to assess specific user experience aspects, such as end user video performance. When analyzing the end user video performance, it can for example be further considered that in order to view a video at a certain resolution, a minimum data throughput is required.

Figure 6:
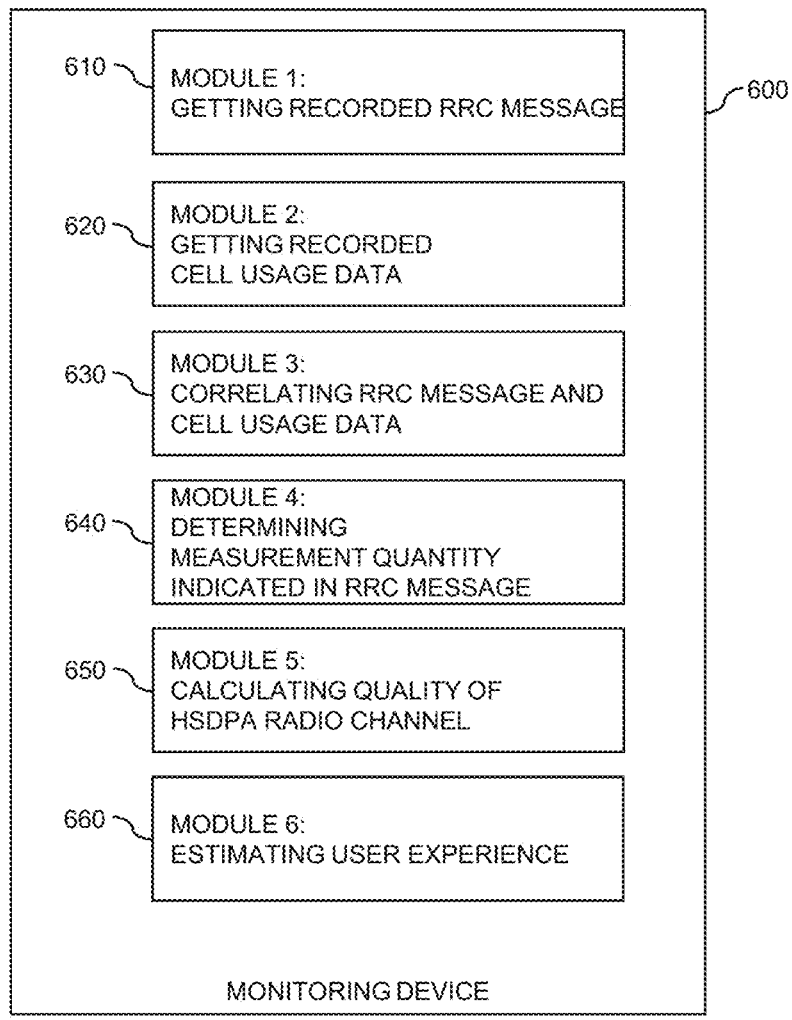
FIG. 6 shows an exemplary block diagram for illustrating functionalities of a monitoring device implementing functionalities corresponding to the method of FIG. 5.

FIG. 6 shows a block diagram for illustrating functionalities of a device 600 which operates according to the method of FIG. 6. The device 600 may for example correspond to any of the above-mentioned entities 150, 300. As illustrated, the device 600 may be provided with a module 610 configured to get an recorded RRC message associated with a user, such as explained in connection with step 510. Further, the device 600 may be provided with a module 620 configured to get recorded data indicative of cell radio resource usage, such as explained in connection with step 520. Further, the device 600 may be provided with a module 630 configured to correlate the RRC message with the data indicative of cell radio resource usage, such as explained in connection with step 530. Further, the device 600 may be provided with a module 640 configured to determine a measurement quantity indicated in the RRC message, such as explained in connection with step 540. Further, the device 600 may be provided with a module 650 configured to calculate quality of a HSDPA radio channel for the user, such as explained in connection with step 550. Further, the device 600 may optionally be provided with a module 660 configured to estimate user experience, such as explained in connection with step 560.

It is noted that the device 600 may include further modules for implementing other functionalities, such as known functionalities of a monitoring device or analysis node for a wireless communication network. Further, it is noted that the modules of the device 600 do not necessarily represent a hardware structure of the device 600, but may also correspond to functional elements, e.g., implemented by hardware, software, or a combination thereof.

Figure 7:
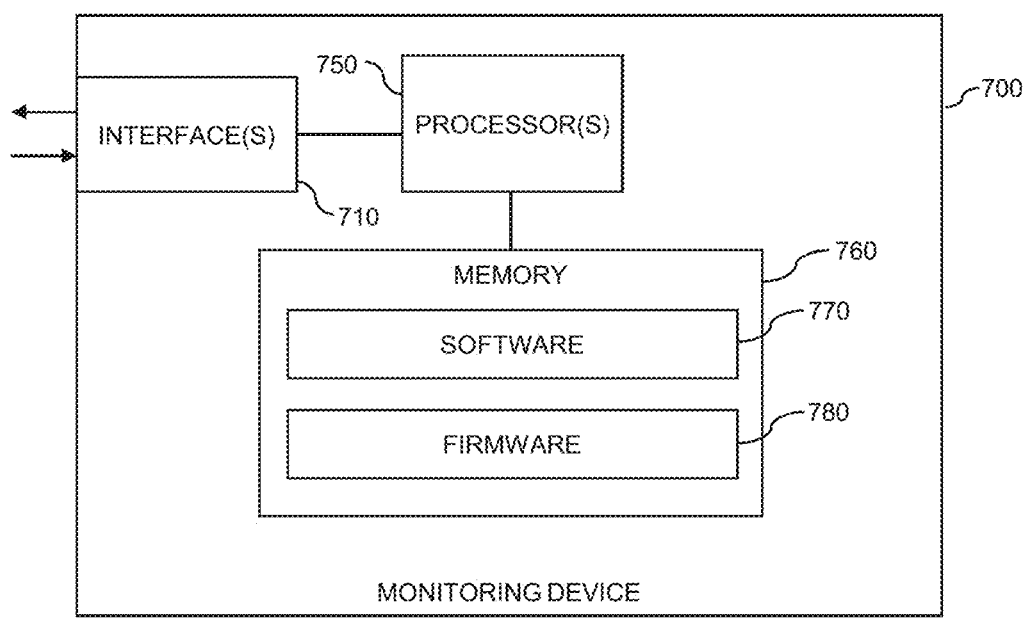
FIG. 7 schematically illustrates structures of a monitoring device according to an embodiment of the invention.

FIG. 7 illustrates a processor-based implementation of a device 700 which may be used for implementing the above described concepts. For example, the structures as illustrated in FIG. 7 may be used for implementing the concepts in any of the above-mentioned entities 150 or 300.

As illustrated, the device 700 includes an interface 710. The interface 710 may be used for communication with one or nodes of a UMTS network, such as UTRAN nodes or CN nodes. Further, the interface 710 may be used for reporting the calculated quality of the HSDPA radio channel and/or results obtained by a further analysis based on the calculated quality of the HSDPA radio channel, such as an indicator of user experience.

Further, the device 700 may include one or more processors 750 coupled to the interface 710 and a memory 760 coupled to the processor(s) 750. By way of example, the interface 710, the processor(s) 750, and the memory 760 could be coupled by one or more internal bus systems of the device 700. The memory 760 may include a ROM (Read Only Memory), e.g., a flash ROM, a RAM (Random Access Memory), e.g., a DRAM (Dynamic RAM) or SRAM (Static RAM), a mass storage, e.g., a hard disk or solid state disk, or the like. As illustrated, the memory 760 may include software 770, and/or firmware 780. The memory 760 may include suitably configured program code to be executed by the processor(s) 750 so as to implement the above-described functionalities of a monitoring device, such as explained in connection with FIGS. 5 and 6. Further, the memory 760 may also be used to record the calculated quality of the HSDPA radio channel, e.g., the CQI, on a user level.

It is to be understood that the structures as illustrated in FIG. 7 are merely schematic and that the device 700 may actually include further components which, for the sake of clarity, have not been illustrated, e.g., further interfaces or processors. Also, it is to be understood that the memory 760 may include further program code for implementing known functionalities of a monitoring device or analysis node. According to some embodiments, also a computer program may be provided for implementing functionalities of the device 700, e.g., in the form of a physical medium storing the program code and/or other data to be stored in the memory 760 or by making the program code available for download or by streaming.

As can be seen, the concepts as described above may be used for efficiently monitoring and analyzing a UMTS network, in particular with respect to aspects of user experience related to quality of a HSDPA radio channel. Since the illustrated concepts rely on input data that may be already available for other purposes, the concepts may be implemented with low complexity and without requiring excessive modification of existing functionalities.

It is to be understood that the examples and embodiments as explained above are merely illustrative and susceptible to various modifications. For example, the illustrated concepts may be applied in connection with various kinds of aspects of user experience. Further, the concepts may be modified with respect to the specific types of input data utilized for calculation of the quality of the HSDPA radio channel. For example, the Ec/No value could also extracted from other types of RRC message, e.g., from a Measurement Report message. Further, the specific utilized parameters of the cell resource usage data could vary. For example, a parameter which was indirectly derived in the above example, e.g., the number of available codes for HSDPA, could also be directly observable, be recorded and used as input data. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules. For example, the above-mentioned analysis platform 150 could also be implemented as a system of multiple interacting devices.

The invention claimed is:

1. A method of monitoring a Universal Mobile Telecommunications System (UMTS) network, the method comprising:
   getting a recorded Radio Resource Control (RRC) message associated with a user;
   getting recorded data indicative of cell radio resource usage in the UMTS network;
   correlating the RRC message with the data indicative of cell radio resource usage;
   determining a measurement quantity indicated in the RRC message; and
   based on the measurement quantity indicated in the RRC message and the correlated data indicative of cell radio resource usage, calculating quality of a High Speed Data Packet Access (HSDPA) radio channel for the user,
   wherein:
      the data indicative of cell radio resource usage comprise a maximum cell transmitted power,
      the data indicative of cell radio resource usage comprise a ratio of power for HSDPA traffic to the maximum cell transmitted power, and
      the data indicative of cell radio resource usage comprise a ratio of power for other traffic than the HSDPA traffic to the maximum cell transmitted power.

2. The method according to claim 1,
wherein:
the measurement quantity is a value of received energy per chip divided by the power density in the band,
the RRC message is an RRC Connection Request message, and
calculating the quality of the radio channel comprises calculating a Channel Quality Indicator (CQI) for the HSDPA radio channel.

3. The method according to claim 1,
wherein:
   the data indicative of cell radio resource usage comprise a ratio of a number of codes used by other traffic than HSDPA traffic to a total number of codes available to other traffic than the HSDPA traffic,
   data indicative of cell radio resource usage comprise a number of codes reserved for HSDPA traffic, and
   the data indicative of cell radio resource usage comprise a transmitted power of a Common Pilot Channel (CPICH).

4. The method according to claim 1, comprising:
estimating user experience for the user based on the calculated quality of the radio channel,
wherein estimating the user experience comprises estimating an achievable user throughput for the user.

5. A device for monitoring a Universal Mobile Telecommunications System (UMTS) network, comprising:
a processor configured to:
   receive a recorded Radio Resource Control (RRC) message associated with a user;
   receive recorded data indicative of cell radio resource usage in the UMTS network;
   correlate the RRC message with the data indicative of cell radio resource usage;
   determine a measurement quantity indicated in the RRC message; and
   based on the measurement quantity indicated in the RRC message and the correlated data indicative of cell radio resource usage, calculate quality of a High Speed Data Packet Access (HSDPA) radio channel for the user,
   wherein:
      the data indicative of cell radio resource usage comprise a maximum cell transmitted power,
      the data indicative of cell radio resource usage comprise a ratio of power for HSDPA traffic to the maximum cell transmitted power, and
      the data indicative of cell radio resource usage comprise a ratio of power for other traffic than the HSDPA traffic to the maximum cell transmitted power.

6. The device according to claim 5,
wherein:
   the measurement quantity is a value of received energy per chip divided by the power density in the band,
   the RRC message is an RRC Connection Request message, and
   the device is configured to calculate the quality of the radio channel by calculating a Channel Quality Indicator (CQI) for the HSDPA radio channel.

7. The device according to claim 5,
wherein:
the data indicative of cell radio resource usage comprise a ratio of a number of codes used by other traffic than HSDPA traffic to a total number of codes available to other traffic than the HSDPA traffic,
the data indicative of cell radio resource usage comprise a number of codes reserved for HSDPA traffic, and
the data indicative of cell radio resource usage comprise a transmitted power of a Common Pilot Channel (CPICH).

8. The device according to claim 5,
wherein the device is configured to estimate user experience for the user based on the calculated quality of the radio channel, and
wherein the device is configured to estimate the user experience by estimating an achievable user throughput for the user.

9. The device according to claim 5, comprising:
at least one processor to perform the recited operations of claim 5, and
a memory containing program code executable by the at least one processor,
whereby execution of the program code by the at least one processor configures the at least one processor to perform the recited operations.

10. A computer program product comprising a non-transitory computer readable media storing program code to be executed by at least one processor of a device for monitoring a Universal Mobile Telecommunications System (UMTS) network, whereby execution of the program code causes the device to perform the method according to claim 1.

* * * * *